(12) United States Patent
Caskey et al.

(10) Patent No.: US 9,331,965 B2
(45) Date of Patent: May 3, 2016

(54) AUTOMATICALLY GENERATING EMAIL SUBJECT LINES

(71) Applicant: International Business Machines Corporation, Armonk, NY (US)

(72) Inventors: Sasha P. Caskey, New York, NY (US); Robert G. Farrell, Cornwall, NY (US); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/974,291

(22) Filed: Aug. 23, 2013

(65) Prior Publication Data

US 2015/0058426 A1  Feb. 26, 2015

(51) Int. Cl.
  *G06F 15/16* (2006.01)
  *H04L 12/58* (2006.01)

(52) U.S. Cl.
  CPC ............... *H04L 51/02* (2013.01); *H04L 51/22* (2013.01)

(58) Field of Classification Search
  CPC .................................. H04L 51/02; H04L 51/22
  USPC ......................................... 709/204, 206, 207
  See application file for complete search history.

(56) References Cited

U.S. PATENT DOCUMENTS

| | | | |
|---|---|---|---|
| 6,873,985 B2 | 3/2005 | Newman | |
| 7,188,142 B2 | 3/2007 | Chi et al. | |
| 7,783,597 B2 | 8/2010 | Kirsch | |
| 8,024,411 B2 | 9/2011 | Pulfer et al. | |
| 8,073,910 B2 | 12/2011 | Tokuda et al. | |
| 8,103,726 B2 | 1/2012 | Stoddard et al. | |
| 2006/0010217 A1* | 1/2006 | Sood | H04L 51/12 709/206 |
| 2007/0198483 A1* | 8/2007 | Li | G06Q 10/107 |
| 2007/0250576 A1 | 10/2007 | Kumar et al. | |
| 2008/0189622 A1* | 8/2008 | Sanchez | G06Q 10/06 715/752 |
| 2009/0222296 A1* | 9/2009 | Wagner | G06Q 30/02 709/206 |
| 2010/0100370 A1 | 4/2010 | Khouri et al. | |
| 2011/0126126 A1* | 5/2011 | Blair | G06Q 10/107 715/752 |
| 2011/0154221 A1* | 6/2011 | DeLuca | G06Q 10/107 715/752 |
| 2012/0089692 A1 | 4/2012 | Stoddard et al. | |
| 2012/0150978 A1* | 6/2012 | Monaco | G06Q 10/107 709/206 |
| 2012/0150979 A1* | 6/2012 | Monaco | G06Q 10/107 709/206 |
| 2012/0191779 A1* | 7/2012 | Mandel | H04L 51/16 709/204 |
| 2012/0203851 A1 | 8/2012 | Hardy et al. | |
| 2012/0323704 A1* | 12/2012 | Steelberg | G06Q 30/0268 705/14.73 |

(Continued)

OTHER PUBLICATIONS

IBM, "Email Recipient Specific Content," IPCOM000189163D, Oct. 2009, 3 pages.

(Continued)

*Primary Examiner* — Phuoc Nguyen
*Assistant Examiner* — Davoud Zand
(74) *Attorney, Agent, or Firm* — Jeff Tang; Ryan, Mason & Lewis, LLP

(57) ABSTRACT

Systems and methods for automatically generating e-mail subject lines are provided. A method for automatic generation of subject lines for electronic mail (email), comprises extracting topics from an email message, computing a sender relevance score for each topic, computing a receiver relevance score for each topic, ranking the topics based on the sender and receiver relevance scores, extracting syntactic units from the email message, ranking the extracted syntactic units from the email message based on the topic ranking, and assigning one or more subject lines to the email message based on the ranking of the syntactic units.

11 Claims, 6 Drawing Sheets

(56) References Cited

U.S. PATENT DOCUMENTS

| | | | | |
|---|---|---|---|---|
| 2013/0117383 A1* | 5/2013 | Hymel | ............... | G06Q 10/107 709/206 |
| 2013/0275429 A1* | 10/2013 | York | ............... | G06F 17/30029 707/737 |
| 2014/0278909 A1* | 9/2014 | Potter | ............... | G06Q 30/0242 705/14.41 |

OTHER PUBLICATIONS

Disclosed Anonymously, "Method of an Automatic & Customized Summary Creation from Email Content at Client End Based on Keywords/Policies Set and Self-Learning Algorithms," IPCOM000207552D, May 2011, 5 pages.

H. Li et al., "Adding Semantics to Email Clustering," IEEE Proceedings of the Sixth International Conference on Data Mining (ICDM), Dec. 2006, pp. 938-942.

Q. Hu et al., "Towards Building Effective Email Recipient Recommendation Service," IEEE International Conference, Jul. 2012, pp. 398-403.

Wikipedia, "tf-idf," http://en.wikipedia.org/w/index.php?title=Tf-idf&oldid=562113654, Jun. 2013, 4 pages.

K. Moore, "Recommendations for Automatic Responses to Electronic Mail," Network Working Group, Request for Comments: 3834, Aug. 2004, 23 pages.

B.K. Boguraev et al., "Discourse Segmentation in Aid of Document Summarization," IEEE Proceedings of the 33rd Hawaii International Conference on System Sciences, Jan. 2000, 10 pages.

G. Salton et al., "Term-Weighting Approaches in Automatic Text Retrieval," Information Processing & Management, Jan. 1988, pp. 512-523, vol. 24, No. 5.

J. Hynek et al., "Practical Approach to Automatic Text Summarization," 7th ICCC/IFIP International Conference on Electronic Publishing held at the Universidade do Minho—ELPUB, Jun. 2003, 10 pages, Minho, Portugal.

M. Dredze et al., "Generating Summary Keywords for Emails Using Topics," 13th International Conference on Intelligent User Interfaces (IUI), Jan. 2008, pp. 199-206, Maspalomas, Gran Canaria, Spain.

* cited by examiner

103

307

AUTOMATICALLY GENERATING EMAIL SUBJECT LINES

TECHNICAL FIELD

The field generally relates to systems and methods for automatically generating email subject lines and, in particular, to systems and methods for automatically generating email subject lines which attract the attention of email recipients.

BACKGROUND

Entering subject lines into emails can be an undesirable and tedious task, particularly when one is pressed for time. Often, composers of emails may leave out subject lines entirely or compose subject lines that fail to capture the essence of the email and/or fail to capture the attention of the recipient of the email. Subject lines are generally more effective when they are crisp and clear so that they garner attention from the reader.

Known processes of auto-generating subject lines from the contents of an email exist only in a very specific form. For example, known methods generate subject lines based on fields that are filled in by a user according to various criteria, including the content of messages. There are no known systems for automatic generation of email subject lines based on the content of emails, which also take into consideration the characteristics of a recipient to catch the attention of potential readers of the emails.

Accordingly, there is a need for systems and methods for automatic generation of useful and personalized subject lines for emails without requiring a user to fill out specific forms and fields.

SUMMARY

In general, exemplary embodiments of the invention include systems and methods for automatically generating e-mail subject lines and, in particular, to systems and methods for automatically generating e-mail subject lines which attract the attention of e-mail recipients.

According to an exemplary embodiment of the present invention, a system for automatic generation of subject lines for electronic mail (email), comprises an extraction module capable of extracting topics from an email message, a prioritization module capable of computing a sender relevance score for each topic, computing a receiver relevance score for each topic, and ranking the topics based on the sender and receiver relevance scores, a parsing module capable of extracting syntactic units from the email message, a sorting module capable of ranking the extracted syntactic units from the email message based on the topic ranking, and an assignment module capable of assigning one or more subject lines to the email message based on the ranking of the syntactic units.

According to an exemplary embodiment of the present invention, a method for automatic generation of subject lines for electronic mail (email), comprises e0xtracting topics from an email message, computing a sender relevance score for each topic, computing a receiver relevance score for each topic, ranking the topics based on the sender and receiver relevance scores, extracting syntactic units from the email message, ranking the extracted syntactic units from the email message based on the topic ranking, and assigning one or more subject lines to the email message based on the ranking of the syntactic units.

According to an exemplary embodiment of the present invention, a computer readable storage medium comprises program code tangibly embodied thereon, which when executed by a computer, performs method steps for automatic generation of subject lines for electronic mail (email), the method steps comprising extracting topics from an email message, computing a sender relevance score for each topic, computing a receiver relevance score for each topic, ranking the topics based on the sender and receiver relevance scores, extracting syntactic units from the email message, ranking the extracted syntactic units from the email message based on the topic ranking, and assigning one or more subject lines to the email message based on the ranking of the syntactic units.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
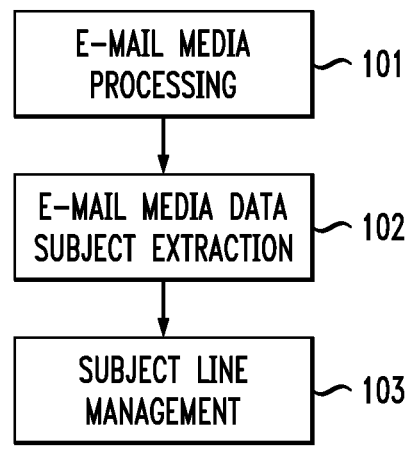
FIG. 1 is a high-level diagram of a system for automatically generating e-mail subject lines according to an exemplary embodiment of the invention.

Exemplary embodiments of the invention will now be discussed in further detail with regard to systems and methods for automatically generating e-mail subject lines and, in particular, to systems and methods for automatically generating e-mail subject lines which attract the attention of e-mail recipients. This invention may, however, be embodied in many different forms and should not be construed as limited to the embodiments set forth herein.

Embodiments of the present invention relate to systems and methods for automatically generating subject lines for emails without requiring a user to fill out specific forms and fields. The automatically generated subject lines are structured to attract a recipient's attention and increase a probability that the email will be read. The embodiments of the present invention automatically generate a subject line for an email based on the content of the email and based on meta information corresponding to the email, for example, the recipients and information about the recipients.

In accordance with an embodiment of the present invention, a system for automatically generating subject lines for emails is continuously updating which topics are important to senders based on e-mails previously sent and/or received by the user, how much time the sender spends on those e-mails, the sender's reactions while reading the e-mails, and what a sender may explicitly list as priority topics (e.g., in a profile, on-line system or application). Topics can be, for example, media units of various types, such as words and phrases. Topics can be identified in text, audio or video within an email message. If a sender prepares an email message without a subject line, systems and methods according to embodiments of the present invention can pick out the sentences in the email message that contain those topics that are important for a sender as potential subject lines. Clauses (e.g., subject, predicate) and phrases (noun phrases, verb phrases) containing these topics can also be picked out as potential subject lines. For example, a subject line could be the sentence "This is an important note regarding the library" or the noun phrase "important note" or the verb phrase "regarding the library".

If the message is addressed to two recipients, one recipient being interested in one set of topics and another recipient being interested in another set of topics, the different interests of the recipients can affect which of the sentences/parts will be selected for the subject line. That is, systems and methods according to embodiments of the present invention will select a sentence/part that contains the most important topics, but also those topics that are of interest to the receiver of the e-mail.

In accordance with an embodiment of the present invention, a system can determine what the recipients are interested in by using the same or similar methods used to determine the most important topics of the sender. For example, it may be determined from corpus frequencies gathered from emails sent and/or received by a sender (discussed in more detail below) that topics A, B, and C have scores of, for example, 10, 20, and 30, respectively. A lower score represents a lower level of importance. In the absence of any other information, then, sentences (or clauses or other possible syntactic elements) with the topic "A" in them would be ranked higher than syntactic elements with the topics "B" and "C".

Then, considering the recipient, this person may have repeatedly received or sent e-mails with the topic "B", resulting in a different scoring of the topics, for example, A=10, B=30, and C=15. In this case, sentences about topic "B" would be ranked higher because of the recipient's scores for the topics. Further, a second recipient may have spent large amounts of time sweating over emails under topic "A", generating, for example, high pulse rates and spending large amounts of time looking at those emails under topic "A". Factoring this information on the second recipient's behavior in connection with emails under topic "A", the scores may be, for example, A=25, B=5, and C=10. In this case, sentences including "A" would be ranked higher than sentences with "C", which would be ranked higher than sentences with "B". It is to be understood that "A", "B" and "C" can represent any topics, including, but not limited to, companies, news items, people, geographic regions, products, etc.

In accordance with embodiments of the present invention, as described in further detail below, a generic subject line with just the sender's topics of interest (e.g., A=10, B=20, and C=30) is also retained in connection with an email, so that the sender has the option of viewing the email based on the sender's generic subject line indicating the sender's preferences, as opposed to viewing the email based on the recipients' subject lines and preferences, enabling the sender to perform a sort of his/her emails to see the multiple messages with the generic subject line. In accordance with an embodiment, the receiver-specific subject line(s) can be included, for example, in parentheses (e.g., "Re: your note about acquisition of C (C is acquiring B's assets)").

As described further below, in accordance with embodiments of the present invention, what the email recipient can see is one subject line, and be allowed to navigate to the less highly ranked subject lines by, for example, pulling down a list, following a hyperlink or pressing a button. Multiple subject lines may also be displayed for a recipient using, for example, a running ticker, or another other visual presentation, including but not limited to, a collage of text and images, a tag cloud of words with different sizes, a topic graph with words connected by lines, and a hierarchical outline of words.

According to an embodiment of the present invention, a user drafts an email on a specific subject or plurality of subjects and a summarization methodology is run to extract key words or phrases from the message to come up with an n-best list of possible subject lines. The n-best list refers to a list of the highest scoring hypotheses (in this case, subject lines), n being a natural number greater than zero. In accordance with an embodiment, a summarization methodology may include computing a score for the frequency of terms in an email versus a score for the frequency of the terms in a corpus of emails to then compute a relevance score. "Corpus" can refer to a collection of emails that have been previously sent (and/or received) over a period of time (e.g., week, month, year, etc.). In connection with computing a frequency score, a "term frequency score" refers to a number of times that a certain word or phrase appears in a particular email, and a "corpus frequency score" refers to a number of times that a certain term or phrase appears in the collection of emails previously sent (and/or received).

When identifying key words or phrases, the term frequency score can be compared to the corpus frequency score so that a term or phrase that frequently appears in a particular email but does not appear or does not appear often in the corpus may be identified as a key topic (e.g., key word or key phrase). Comparing the term or phrase frequency in a particular email to the term or phrase frequency of the corpus enables weeding out of frequently appearing words, such as, for example, "the", "a", "or", etc., which may appear often in both the particular email and the corpus, so that these frequently appearing words or phrases are not identified as key words or phrases. Words or phrases which appear more frequently in the particular email than in the corpus are identifiable as key words or phrases and are given priority when creating the summarization. For example, an email message about a new programming language might repeatedly mention the word "language". If "language" appears five times in a 100-word email, but appears only once per 100 words in the corpus, then it is identified as a key word. This illustrates one of the methods according to an embodiment of the present invention by which the topics important to a sender can be identified.

As explained above, embodiments of the present invention then also take into account personalization relating to the specific recipients of the email. For example, a corpus can be indexed according to recipient so that the corpus is a collection of emails that have been previously sent over a period of time to or by a given recipient. In accordance with an embodiment of the present invention, in the corpus for particular recipients, like the emails in the corpus for a sender, summaries of the emails sent to (or by) particular recipients are created, and data is collected regarding which emails were responded to and/or which emails received the most attention by a recipient. In accordance with embodiments of the present invention, attention given to emails is measured by, for example, tallying the volume of clicks through a given email and/or the time spent viewing a particular email or by asking recipients to rate the email. From this data, profiles of what types of emails or subjects certain recipients are interested in can be generated and used to tailor rankings of subject lines to individual recipients.

Rankings are given to each possible subject line on the n-best list based on the amount of topic key words/phrases in the subject line, the importance of those topics to the sender, and the amount of interest the recipient has in those topics. The recipient is the person to whom the email is directed. According to an embodiment, a sender relevance score for each topic is calculated to determine the importance of those topics to the sender. For example, as described above, term frequency-inverse document frequency (tf-idf) is utilized to identify and rank key words or phrases based on a term's or phrase's frequent appearance in a particular email and lack of or infrequent appearance in the corpus, wherein the corpus is the emails sent by (and/or to) a user. For example, tf-idf refers to a numerical statistic reflecting the importance of a word to a document with respect to a corpus. The tf-idf value increases proportionally to the number of times a word appears in the document, but is also offset by the frequency of the word in the corpus, taking into account that some words are generally more common than others. It is to be understood that the embodiments of the present invention are not limited to the use of tf-idf, and other summarization methodologies may be used. In addition, the sender's behavior when reading or drafting emails and the sender's profile information may be used to calculate the sender relevance score for each topic.

Then, the subject lines on the n-best list are ranked based on a receiver relevance score for each topic that might garner the attention of the recipient, using, for example, prior emails sent to and/or received by the recipient and a summarization of those emails indicating, for example, to which types of emails the recipient is more likely to respond. In addition, if any information is known about the recipient, including, for example, what the recipient is currently reading or their interests, this type of information can also be contained in a profile of the recipient and used to calculate the receiver relevance score for each topic. For example, in the context of a sender and recipient being linked over the social network, embodiments of the present invention may have access to recipients' profiles in the social network and use the information about the recipients therein to personalize the subject lines. Given a recipient relevance score, the subject lines on the n-best list for a current email are ranked based on the personal preferences of the recipient, wherein subject lines relating to the interests of a particular recipient can be ranked higher than those not related to interests of the recipient.

After the subject lines on the n-best list are ranked according to sender and receiver relevance scores, the highest ranked subject lines are selected. For example, one, two, or three subject lines might be selected according to the choice of method of presenting the subject lines to the user. For example, if no ticker is possible, then a single subject line could be used. The email including the top ranked personalized e-mail subject line is sent out to each reader. According to an embodiment, the e-mail subject lines can be different for each recipient depending on, for example, observed or determined characteristics of the recipient, and resulting rankings based on the personalized characteristics. In accordance with an embodiment, as mentioned above, a generic subject line for the sender, which is not seen by the recipient, is also attached to the email to facilitate identification of the email sent by the user, and to prevent the sender from having to identify an email based on a variety of personalized subject lines for each recipient. According to an embodiment, when a recipient replies to the sender, the personalized subject line is transformed back into a generic subject line for the sender so the sender can keep track of each of the emails sent out with this subject. Alternatively, instead of the personalized subject line being hidden from view of the sender, the personalized subject lines can be displayed next to the recipient's name, or listed with the generic subject line so that the sender can see both the personalized and generic subject lines.

In accordance with an embodiment of the present invention, as stated above, a subject line can be formed as a running ticker or other similar mechanism for visualization of multiple subject lines, so that an entirety of longer subject lines can be seen in the limited space for a subject line, or a plurality of subject lines (e.g., differently ranked subject lines covering different topics) can be viewed in turn in the designated space for a subject line.

According to embodiments of the present invention, summaries and corresponding subject lines can be generated after the email is completely typed (e.g., at the click of a button, after some predetermined time period after typing of the email message has ceased, or after the "send" key is pressed, i.e., when the email is being delivered) or summaries and corresponding subject lines can be continuously updated as the body of an email message is typed.

Referring to FIG. 1, which illustrates a system for automatically generating e-mail subject lines, according to an embodiment of the present invention, an e-mail media processing module 101 retrieves some or all media data (e.g., audio, text, video) in an email message input and maps the media data into a semantically meaningful representation(s) using one or more semantic processors. Referring, for example, to steps 601 and 602 of the method described in connection with FIG. 6 below, email media data subject extraction module 102 determines and extracts meaningful and significant parts of the input (referred to herein as "topics") from email media processing module 101 (e.g., key words, key phrases, etc.) using a summarization methodology, such as, for example, tf-idf and creates subject line statements. The subject line statements may be phrases, clauses, or entire sentences. The e-mail message is comprised of one or more media (e.g., audio, text, video), and the extraction module 102 extracts one or more topics (as units of media) from the e-mail message. For example, a textual or audio unit can be a key word, key phrase, or sentence. Video units can be based on an audio track of the video. Referring, for example, to step 608 of the method described in connection with FIG. 6 below, subject line management module 103 puts chosen subject line statements into a subject line and/or creates content for a subject line ticker or other configuration.

Figure 2:
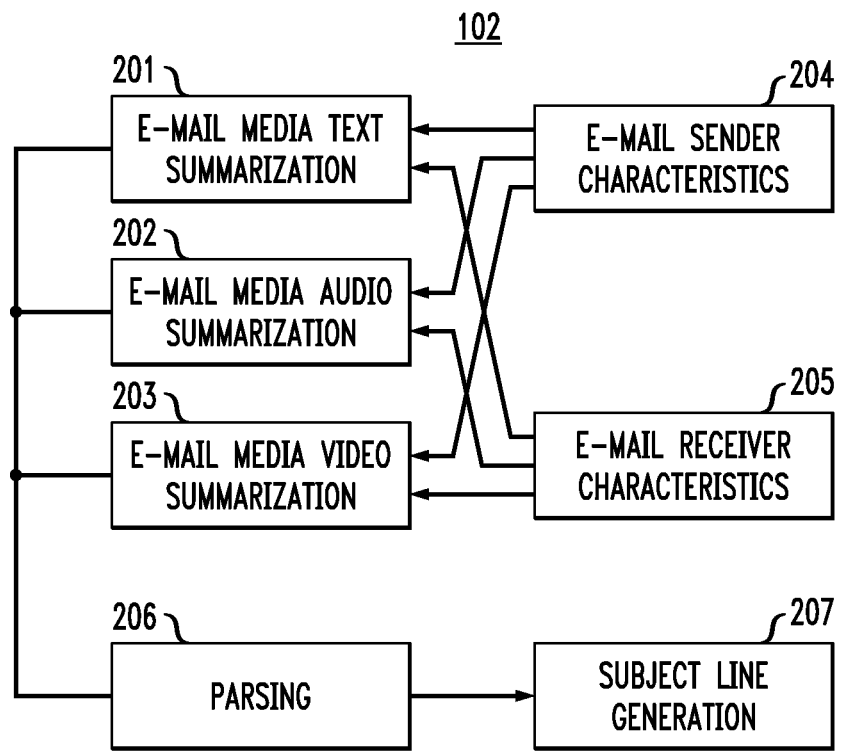
FIG. 2 is a high-level diagram of an email media data subject extraction module from FIG. 1 in a system for automatically generating e-mail subject lines according to an exemplary embodiment of the invention.

FIG. 2 illustrates the email media data subject extraction module 102, in accordance with an embodiment of the present invention. The email media data subject extraction module 102 includes email media text, audio and video summarization modules 201, 202, 203 which summarize and abstract content that a sender created for an email. According to an embodiment, the content summaries can be created using a summarization methodology, such as, for example, tf-idf discussed above, which extract topics, such as key phrases and sentences, to eventually be incorporated into subject lines. In addition, according to an embodiment, the summaries can be created using characteristics of the sender and/or of a receiver of the email received from email sender and receiver characteristics modules 204, 205. For example, if a sender or recipient is characterized in a profile or through an analysis of a corpus of emails and/or behavior, as paying more attention to some kind of data (e.g., stocks, spending, revenue, etc.) then portions of the email relevant to these sender and/or recipient characteristics are used when summarizing the email content. Referring, for example to step 602 of the method described in connection with FIG. 6, or to step 711 of the method described in connection with FIG. 7, the summaries from the text, audio and video summarization modules 201, 202, 203 are then used to create subject lines in the subject line generation module 207.

In accordance with an embodiment of the present invention, subject lines represent short and compressed representations of one or more summaries from the summarization modules 201, 202, 203. The extraction module further includes a parsing module 206, which extracts syntactic units (e.g., sentences, subjects, predicates) that become the possible subject lines (see, e.g., FIG. 6, step 606). These extracted syntactic units are ranked based on the topic rankings (see discussion in connection with FIGS. 4 and 6 below), and used by the subject line generation module 207 to create the subject lines.

According to an embodiment, if there are a plurality of possible topics in the email message that lead to different summaries, the subject line generation module 207 creates several subject lines that can be run in a subject line ticker or other configuration for displaying multiple subject lines, such as, for example, a collage, tag cloud, topic graph, outline, or other configuration. For example, an email may include a plurality of paragraphs covering different topics resulting in different summaries and their corresponding subject lines. According to an embodiment, whether or not a configuration for displaying multiple subject lines is utilized may be determined by a threshold length of the message, incorporating the configuration for displaying multiple subject lines when the message is longer than a predetermined length, and deemed likely to include multiple topics. The number of subject lines utilized (e.g., in the ticker) may be determined by counting the number of paragraphs or using a word count (e.g., 25 words).

Figure 3:
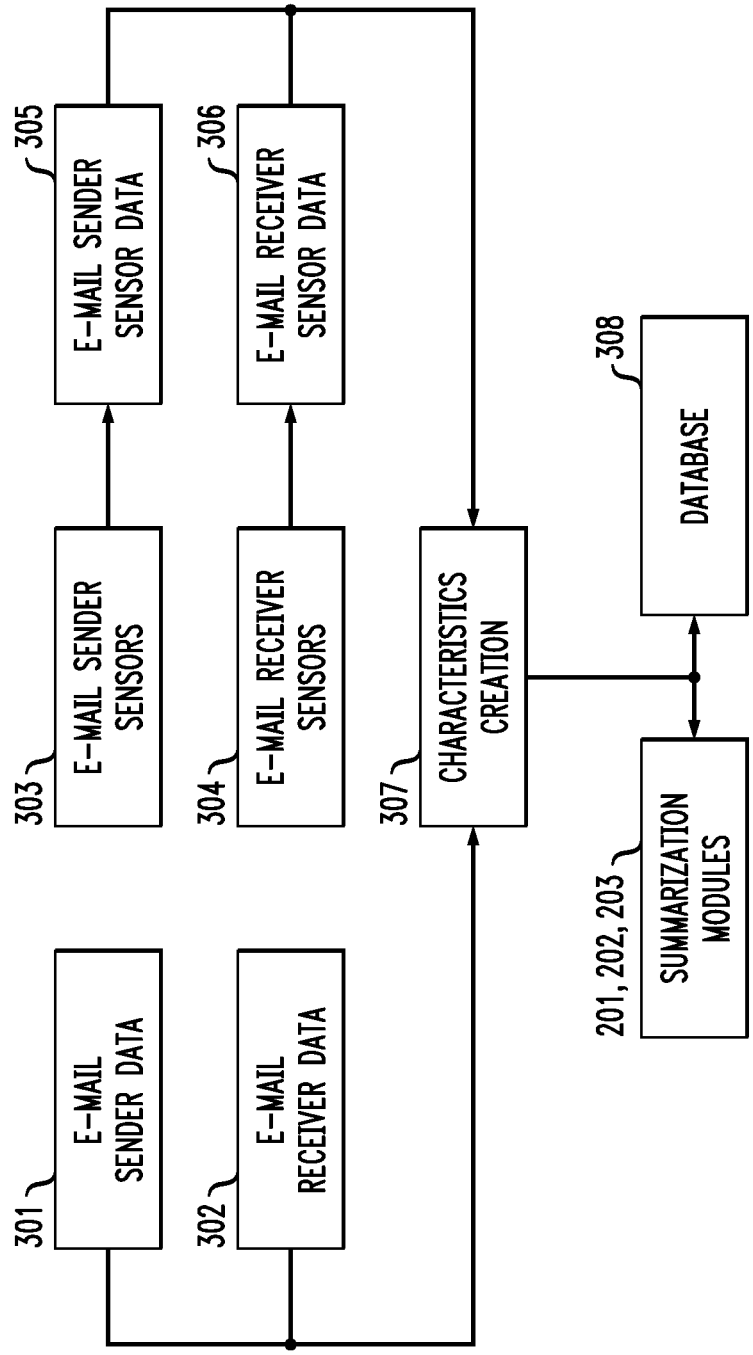
FIG. 3 is a high-level diagram of email sender and receiver characteristics modules from FIG. 2 in a system for automatically generating e-mail subject lines according to an exemplary embodiment of the present invention.

FIG. 3 illustrates components of email sender and receiver characteristics modules 204, 205, according to an embodiment of the present invention. It is to be understood that although shown in the same block diagram, email sender and receiver characteristics modules 204, 205 and their corresponding components can be remote from each other (e.g., respectively at the locations of the sender and receiver) and linked by, for example, direct or network connections, to the summarization modules 201, 202, 203 and database 308.

In accordance with an embodiment, email sender and receiver sensors 303, 304, including, but not limited to, pulse/heart rate detectors to detect elevated rates and skin conductance sensors to detect perspiration when reading or composing e-mails, eye tracking and movement detectors to detect focusing on portions of an e-mail message and/or for visual messages, timers to determine how long a user spends reviewing a particular e-mail message, and/or emotional voice detectors for voice messages, provide sensor data 305 and 306 relating to, for example, observed user attention and emotions during the email creation or email review process. In accordance with an embodiment of the present invention, the sensor data is gathered over a predetermined time period (e.g., days, weeks, months, etc.). A characteristics creation module 307, which, according to an embodiment, can be a distinct module for each sender and receiver characteristics module 204, 205, processes the sensor data 305 or 306 to determine respective sender and receiver characteristics that can be fed to the summarization modules 201, 202 and 203 or stored in an accessible database 308 of sender and receiver characteristics to be used during scoring of topics. According to an embodiment, the characteristics creation module 307 processes the sensor data 305 or 306 together with existing sender or receiver data 301 or 302 to determine the respective sender and receiver characteristics that can be stored in the accessible database 308 and/or used by the summarization modules 201, 202 and 203 to create characteristic driven email summaries. Existing sender or receiver data 301, 302 can be, for example, sender or receiver data available in a sender or receiver profile (e.g., a sender or receiver being interested in stock information and becoming upset if a stock went down).

Figure 4:
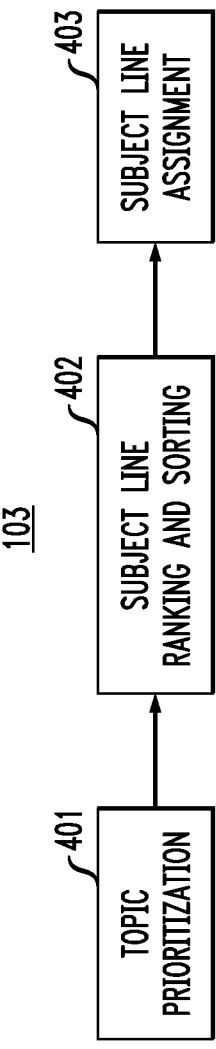
FIG. 4 is a high-level diagram of a subject line management module from FIG. 1 in a system for automatically generating e-mail subject lines according to an exemplary embodiment of the present invention.

Referring to FIG. 4, which is an example of a subject line management module 103, according to an embodiment of the present invention, a topic prioritization module 401 prioritizes several possible topics from an email. In accordance with an embodiment of the present invention, referring, for example to steps 603, 604 and 605 of the method described in connection with FIG. 6 below, the topics are prioritized by computing sender and receiver relevance scores for topics in the list of possible subject lines (e.g., an n-best list). In accordance with an embodiment, a sender relevance score is computed according to a summarization methodology, such as, for example, tf-idf, where the corpus is the collection of emails sent by (and/or) the sender. For example, scores may be determined from corpus frequencies gathered from emails sent by a sender for topics A, B, and C in the list based on an importance of each topic in the email message relative to the corpus of all email messages previously sent by a sender. A lower score represents a lower level of importance. In the absence of any other information, then, sentences (or clauses or other possible syntactic elements) including a topic with a higher score would be ranked higher than syntactic elements including topics with lower scores. In addition, sender characteristics, from, for example, characteristics database 308, can be used to further determine the importance of topics based on sender preferences obtained from sender profiles and/or behavioral observations, and matches found between topics and the sender characteristics.

Similar to the computation of a sender relevance score, in accordance with an embodiment, a receiver relevance score is also computed according to a summarization methodology, such as, for example, tf-idf, where the corpus is the collection of emails received and/or sent by the recipient. Referring, for example, to step 604 in the method described in connection with FIG. 6, scores may be determined from corpus frequencies gathered from emails sent to (and/or by) a recipient for topics A, B, and C in the list based on an importance of each topic in the email message relative to the corpus of all email messages previously sent to (and/or by) a recipient. As with the sender relevance score, a lower score represents a lower level of importance. In addition, receiver characteristics, from, for example, characteristics database 308, can be used to further determine the importance of topics based on receiver preferences obtained from receiver profiles and/or behavioral observations, and matches found between topics and the receiver characteristics.

Referring, for example, to step 605 in the method described in connection with FIG. 6, the topics are ranked by the topic prioritization module based on the sender and receiver relevance scores. According to an embodiment, topics having both sender and receiver non-zero relevance scores are extracted, the receiver relevance scores are normalized to a 0 to 1.0 scale (with 1.0 being the score for the most relevant topic) and the sender relevance score is weighted by (multiplied by) the normalized receiver score. The topics having only a sender relevance score are multiplied by the average normalized receiver score. In this way, receiver relevance is used to amplify sender relevance. The topics are sorted to create a ranking, with the most relevant topics receiving a high ranking.

Referring, for example, to step 607 in the method described in connection with FIG. 6, a subject line ranking and sorting module 402 ranks the extracted syntactic units (e.g., clauses, sentences, etc.) forming part or all of the subject lines based on the topics included therein, ranking the syntactic units including higher ranked topics and/or the highest number of higher ranked topics with a corresponding higher rank, and randomizes syntactic units that have equal importance (e.g., having the same topics). The ranking and sorting module 402 places more important syntactic units having higher ranks earlier in a queue. Referring, for example, to step 608 of the method described in connection with FIG. 6, a subject line assignment module 403 assigns as the subject line or as part of the subject line, the syntactic units with the highest rank. Syntactic units may also be assigned according to their determined priority order based on the ranks as subject lines or parts of subject lines to be played in a ticker or displayed in another format for viewing multiple subject lines. Techniques for extracting syntactic units from text are well known in the art.

Figure 5:
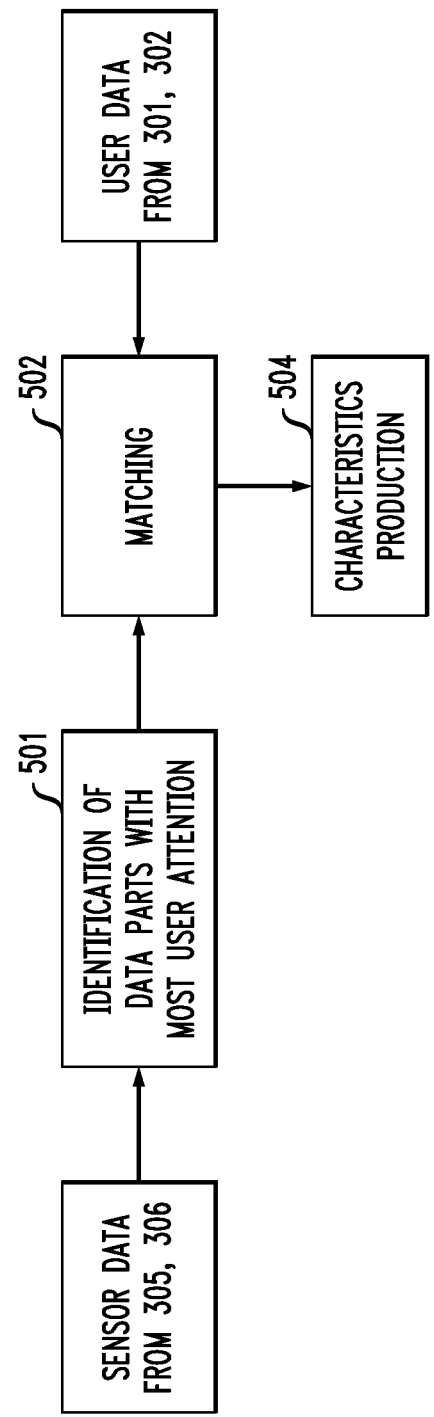
FIG. 5 is a high-level diagram of a characteristics creation module from FIG. 3 in a system for automatically generating e-mail subject lines according to an exemplary embodiment of the present invention.

Referring to FIG. 5, which is an example of a characteristics creation module 307, according to an embodiment of the present invention, an identification module 501 identifies parts of e-mail data that receive most of user attention using the sensor data 305, 306 including, for example, observed user attention and emotions during the email creation or email review process. A matching module 502 matches the identified parts of data receiving most of user attention to user characteristics received from existing sender or receiver data 301, 302 to identify why the data parts receiving most of user attention got that attention. For example, the matching module 502 may show that a user worried about finance pays a relatively large amount of attention to stock data. A characteristics production module 504 isolates the matched user characteristics to designate the user characteristics that can be used by the summarization modules 201, 202 and 203 and/or stored in database 308.

Figure 6:
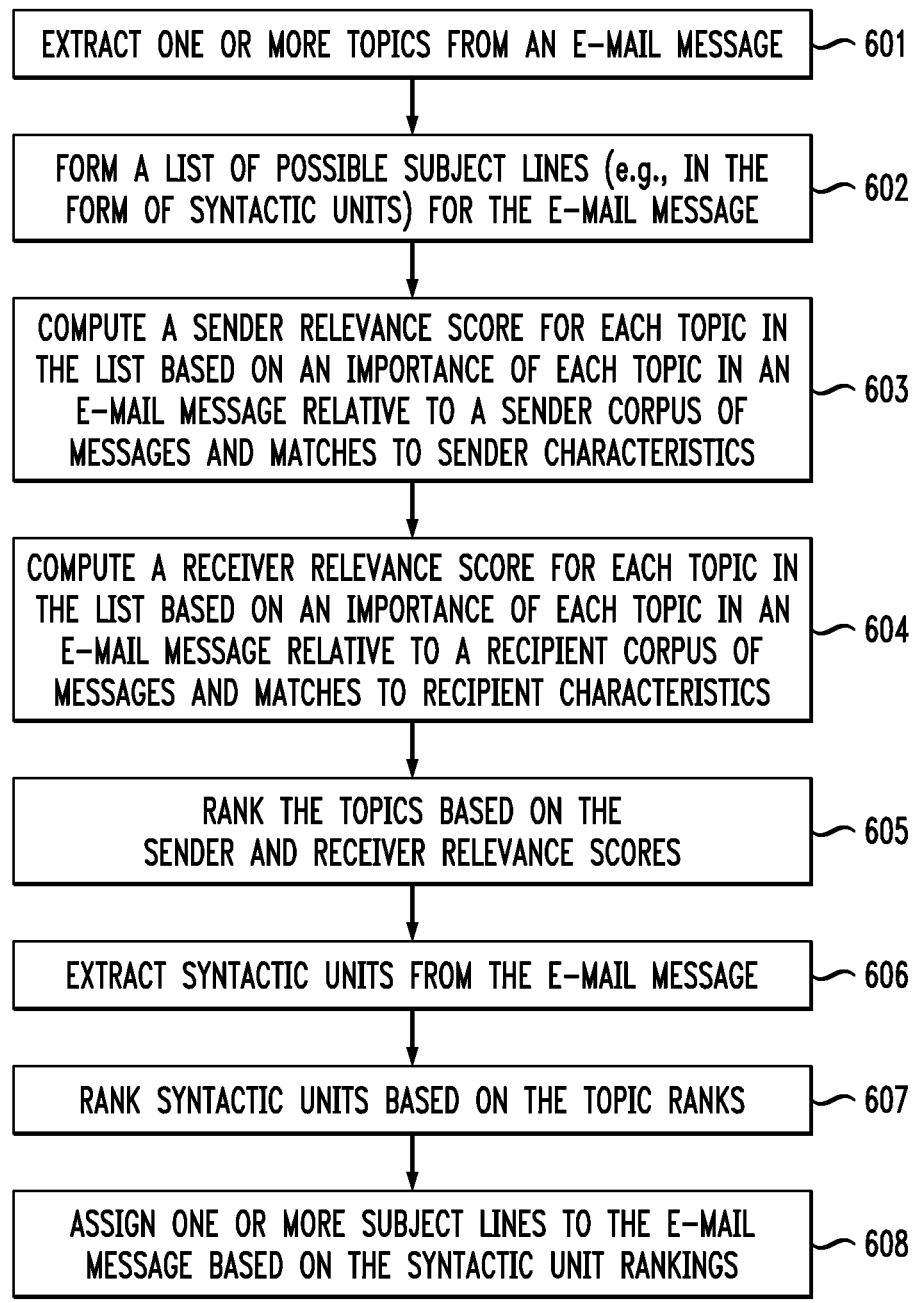
FIG. 6 is a flow diagram of a method for automatically generating e-mail subject lines according to an exemplary embodiment of the present invention.

Referring to FIG. 6, which is a flow diagram of a method for automatically generating email subject lines, according to an exemplary embodiment of the present invention, the method includes extracting one or more topics (e.g., key words or key phrases) from an email message (block 601) using, for example, a summarization methodology, and forming a list (e.g., an n-best list) of possible subject lines for the email message (block 602) based on the extracted topics. As described above in connection with FIGS. 1 and 2, steps 601 and 602 can be performed by extraction module 102 and subject line generation module 207, respectively.

At block 603, a sender relevance score is computed according to a summarization methodology, such as, for example, tf-idf, where the corpus is the collection of emails sent by (and/or) the sender. a sender relevance score is computed according to a summarization methodology, such as, for example, tf-idf, where the corpus is the collection of emails sent by (and/or) the sender. For example, scores may be determined from corpus frequencies gathered from emails sent by a sender for topics A, B, and C in the list based on an importance of each topic in the email message relative to the corpus of all email messages previously sent by a sender. In addition, sender characteristics, from, for example, characteristics database 308, can be used to further determine the importance of topics based on sender preferences obtained from sender profiles and/or behavioral observations, and matches found between topics and the sender characteristics.

At block 604, similar to the computation of a sender relevance score, in accordance with an embodiment, a receiver relevance score is also computed according to a summarization methodology, where the corpus is the collection of emails received and/or sent by the recipient. Further, like with the sender relevance score, receiver characteristics, from, for example, characteristics database 308, can be used to further determine the importance of topics based on receiver preferences obtained from receiver profiles and/or behavioral observations, and matches found between topics and the receiver characteristics. As described above in connection with FIG. 4, steps 603 and 604 can be performed by topic prioritization module 401. In addition, the topics are ranked by the topic prioritization module 402 based on the sender and receiver relevance scores (block 605). As an alternative to ranking the topics based on both the sender and receiver relevance scores, systems and methods according to embodiments of the present invention can rank the topics based upon only a sender relevance score or only a receiver relevance score without computing the remaining relevance score.

At block 606, which can be performed by the parsing module 206, syntactic units are extracted from the email message. Referring to steps 607 and 608, which can be performed by the ranking and sorting module 402, and the subject line assignment module 403, respectively, the extracted syntactic units that will make up the subject lines, or part of the subject lines, are ranked based on the topic ranks, and one or more subject lines are assigned to the email message based on the syntactic unit rankings.

In accordance with an embodiment of the present invention, the extraction module 102 computes a term frequency score for the frequency of terms in the email message, computes a corpus frequency score for the frequency of the terms in a corpus of emails, and compares the term frequency score to the corpus frequency score to identify the topics of importance. The characteristics creation module 307 derives the one or more characteristics from data taken in connection with emails that have been drafted, read and/or responded to the sender or intended recipient over a period of time.

According to embodiment of the present invention, the subject line assignment module 403 assigns different subject lines to the email message for each respective recipient of a plurality of recipients of the email message, assigns a different subject line from the one or more of the subject lines assigned to the email message, wherein the different subject line is visible to a sender of the email message and not visible to the recipient, and/or assigns a plurality of the subject lines to the email message to be visible to the intended recipient in a configuration for allowing viewing of multiple subject lines.

Figure 7:
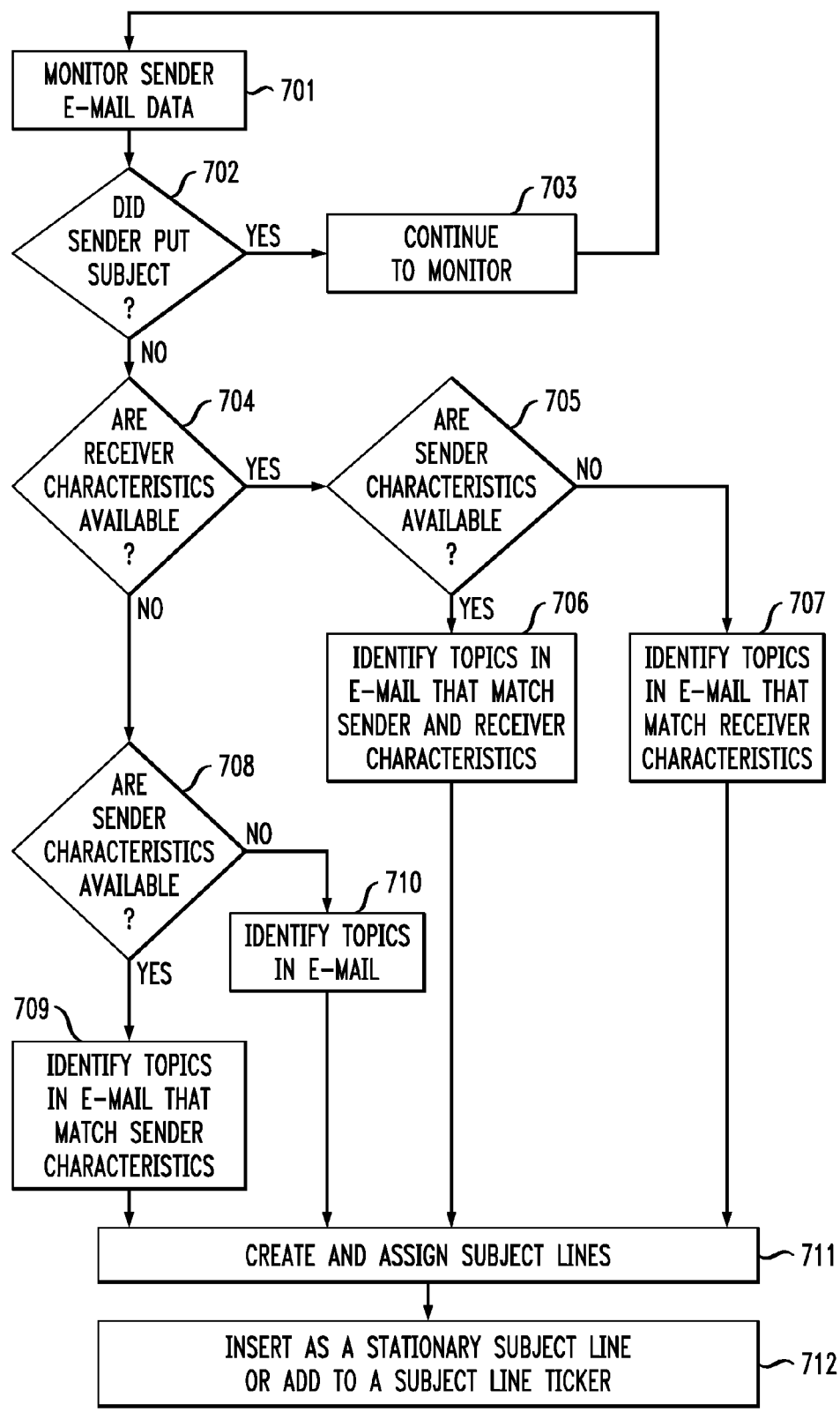
FIG. 7 is a flow diagram of a method for automatically generating e-mail subject lines according to an exemplary embodiment of the present invention.

Referring to FIG. 7, which is a flow diagram of a method for automatically generating email subject lines, according to an exemplary embodiment of the present invention, at step 701, sender email data is monitored to determine if a sender included a subject line for the email (block 702). If it is determined that the sender already included a subject line, monitoring continues (block 703). If it is determined that the sender did not include a subject line for the email, then it is queried at block 704 whether receiver/recipient characteristics to be used when identifying relevant email topics are available. Then, whether or not receiver/recipient characteristics are available, it is further queried at blocks 705 and 708 whether sender characteristics to be used when identifying relevant email topics are available. Following block 705, if there are both sender and receiver characteristics available, topics in an email that match sender and receiver characteristics to be used when creating subject lines are identified (block 706). If there are receiver, but no sender characteristics available, topics in an email that match receiver characteristics to be used when creating subject lines are identified (block 707). Following block 708, if there are sender, but no receiver characteristics, topics in an email that match sender characteristics to be used when creating subject lines are identified (block 709). If there are neither sender nor receiver characteristics available to be used when identifying relevant email topics, topics in an email to be used when creating subject lines are identified without consideration of sender and receiver characteristics (block 710). Then, following identification of the topics at blocks 706, 707, 709 or 710, one or more subject lines for the email are created and assigned (block 711) and inserted as a stationary subject line or added to a configuration for viewing multiple subject lines (block 712).

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-7 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 8:
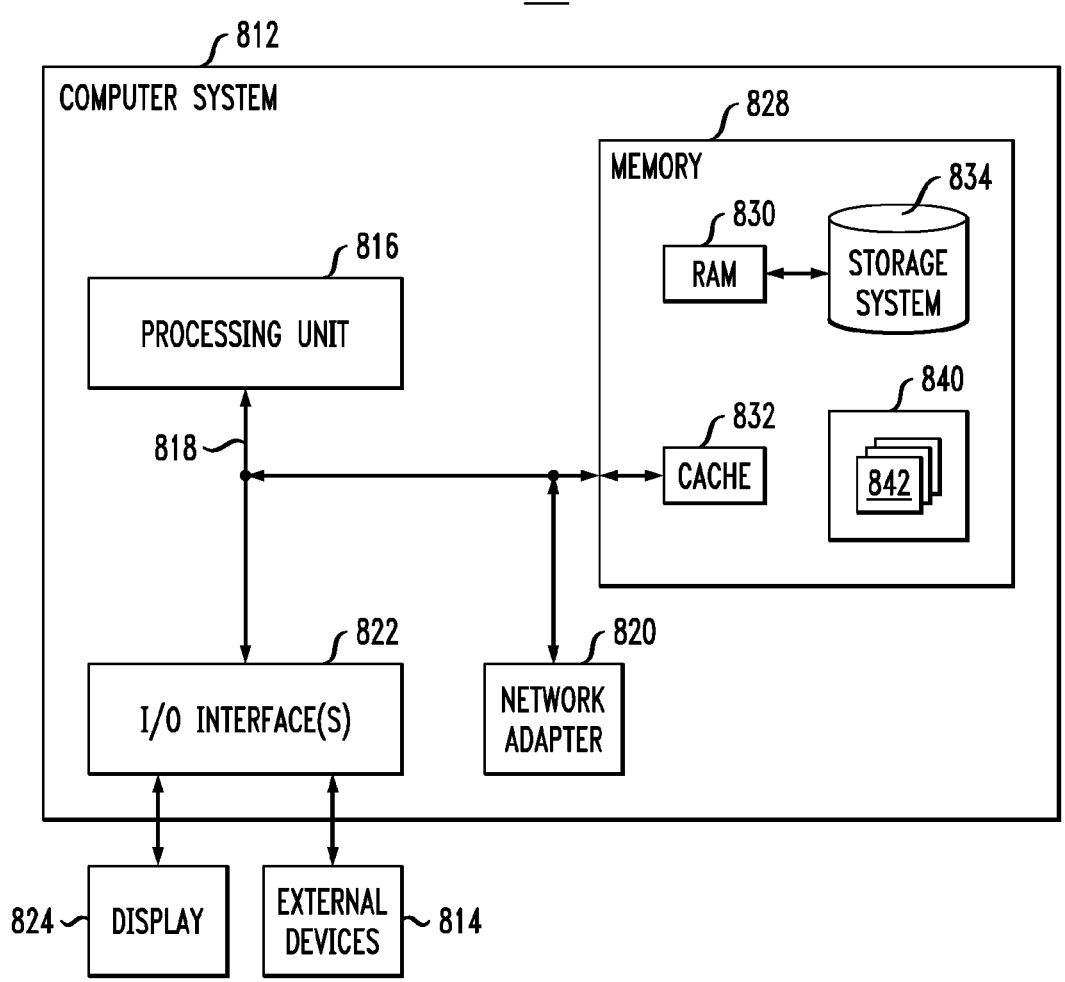
FIG. 8 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for automatic generation of subject lines for electronic mail (email), comprising:
    a memory, and at least one processor operatively coupled to the memory;
    an extraction module executed via the at least one processor and capable of extracting topics from an email message;
    a prioritization module executed via the at least one processor and capable of computing a sender relevance score for each topic, and ranking the topics based on the sender relevance scores;
    a sorting module executed via the at least one processor and capable of ranking a plurality of syntactic units from the email message based on the topic ranking; and
    an assignment module executed via the at least one processor and capable of assigning one or more subject lines to the email message based on the ranking of the syntactic units;
    wherein the assignment module is further capable of:
        assigning different subject lines to the email message for each respective intended recipient of a plurality of intended recipients of the email message so that each respective intended recipient is sent the same email message with a different subject line from that of other intended recipients, wherein the different subject line corresponding to an intended recipient is determined based on one or more characteristics of the intended recipient; and assigning an identifying subject line different from the one or more of the subject lines assigned to the email message, the identifying subject line indicating one or more preferences of a sender of the email message and being visible to the sender and not visible to a recipient of the email message;

wherein, when the sender receives a reply to the email message from the recipient, the reply email message includes the identifying subject line instead of the one or more of the subject lines assigned to the email message, or a combination of the identifying subject line and the one or more of the subject lines assigned to the email message.

2. The system according to claim 1, wherein the prioritization module is capable of computing the sender relevance score by comparing a term frequency score for a topic to a corpus frequency score for the topic, wherein the corpus frequency score is based on a corpus of emails that have been at least one of sent or received by the sender of the email message over a period of time.

3. The system according to claim 2, wherein the prioritization module is capable of computing the sender relevance score by further identifying topics that match one or more characteristics of the sender of the email message.

4. The system according to claim 3, wherein the one or more characteristics of the sender are derived from behavioral data of the sender taken in connection with the corpus of emails.

5. The system according to claim 1, wherein the prioritization module is further capable of computing a receiver relevance score for each topic, and ranking the topics based on the sender and receiver relevance scores.

6. The system according to claim 5, wherein the prioritization module is capable of computing the receiver relevance score by comparing a term frequency score for a topic to a corpus frequency score for the topic, wherein the corpus frequency score is based on a corpus of emails that have been at least one of sent or received by the intended recipient of the email message over a period of time.

7. The system according to claim 6, wherein the prioritization module is capable of computing the receiver relevance score by further identifying topics that match the one or more characteristics of the intended recipient of the email message.

8. The system according to claim 7, wherein the one or more characteristics are derived from behavioral data of the intended recipient taken in connection with the corpus of emails.

9. The system according to claim 1, wherein the topics comprise at least one of key words or key phrases.

10. The system according to claim 1, wherein the assignment module is further capable of assigning a plurality of the subject lines to the email message to be visible to an intended recipient in a configuration for displaying the plurality of the subject lines.

11. А non-transitory computer readable storage medium comprising program code tangibly embodied thereon, which when executed by a computer, performs method steps for automatic generation of subject lines for electronic mail (email), the method steps comprising:

extracting topics from an email message;

computing a sender relevance score for each topic;

computing a receiver relevance score for each topic;

ranking the topics based on the sender and receiver relevance scores;

ranking a plurality of syntactic units from the email message based on the topic ranking;

assigning one or more subject lines to the email message based on the ranking of the syntactic units;

assigning different subject lines to the email message for each respective intended recipient of a plurality of intended recipients of the email message so that each respective intended recipient is sent the same email message with a different subject line from that of other intended recipients;

wherein the different subject line corresponding to an intended recipient is determined based on one or more characteristics of the intended recipient; and assigning an identifying subject line different from the one or more of the subject lines assigned to the email message, the identifying subject line indicating one or more preferences of a sender of the email message and being visible to the sender and not visible to a recipient of the email message;

wherein, when the sender receives a reply to the email message from the recipient, the reply email message includes the identifying subject line instead of the one or more of the subject lines assigned to the email message, or a combination of the identifying subject line and the one or more of the subject lines assigned to the email message.

* * * * *